United States Patent [19]
Schottmüller et al.

[11] Patent Number: 5,920,841
[45] Date of Patent: Jul. 6, 1999

[54] SPEECH SUPPORTED NAVIGATION OF A POINTER IN A GRAPHICAL USER INTERFACE

[75] Inventors: Claus Schottmüller, Karlsruhe; Viktor Schwab, Pforzheim, both of Germany

[73] Assignee: International Business Machines Corporation, Armonk, N.Y.

[21] Appl. No.: 08/882,667

[22] Filed: Jun. 25, 1997

[30] Foreign Application Priority Data

Jul. 1, 1996 [EP] European Pat. Off. ............ 96 110 599

[51] Int. Cl.[6] .................................. G10L 9/06; G06F 3/16
[52] U.S. Cl. ........................................... 704/275; 345/157
[58] Field of Search .............................. 704/275; 345/157

[56] References Cited

U.S. PATENT DOCUMENTS

| | | | |
|---|---|---|---|
| 5,068,645 | 11/1991 | Drumm | 345/184 |
| 5,133,011 | 7/1992 | McKiel, Jr. | 704/276 |
| 5,142,655 | 8/1992 | Drumm | 379/52 |
| 5,287,119 | 2/1994 | Drumm | 345/158 |
| 5,377,303 | 12/1994 | Firman | 704/275 |
| 5,659,665 | 8/1997 | Whelpley, Jr. | 704/275 |

*Primary Examiner*—David R. Hudspeth
*Assistant Examiner*—Tālivaldis Ivars Šmits
*Attorney, Agent, or Firm*—Edward H. Duffield; Andrew J. Dillon

[57] ABSTRACT

A method and an apparatus for speech controlled navigation of a pointer in a graphical user interface. Previous methods use speech commands like arrow keys of a keyboard and lack user friendly interfaces. The method and apparatus therefore provides a space of discrete position states (quantization) for the pointer which can be navigated only via those discrete positions by means of speech command input. The granularity of the discrete position states can be adapted to the respective application window and the position states can be represented by a system of coordinates where the speech command input is based on absolute or relative coordinates. Advantageously a copy image of the graphical user interface of operation can be provided in front of or beside the actual user interface and a proxy pointer device is displayed on the copy image. In one embodiment, only the copy image comprises the discrete position states, and the speech input commands are only transferred to the copy image. Navigation of the proxy pointer device within the copy is transferred and converted into commands within the actual user interface. By this method, an operation event effected by a manipulation of the proxy pointer effects a corresponding event at the user interface.

19 Claims, 6 Drawing Sheets

SPEECH SUPPORTED NAVIGATION OF A POINTER IN A GRAPHICAL USER INTERFACE

BACKGROUND OF THE INVENTION

1. Technical Field

The present invention relates in general to the navigation of a pointer device, such as a mouse pointer or a pointer tablet, in a graphical user interface of an application program by speech controlled input commands. More particularly, the present invention relates to a method and system for speech controlled navigation of such a pointer.

2. Description of the Related Art

The increasing demand for simplicity of operation of a computer has substantially determined the development of graphical user interfaces (GUIs) for the operation of application programs in a computer operating system or the operating systems themselves. A further improvement of operability has been accomplished by the development of powerful speech recognition systems which provide support for technologically unskilled or physically handicapped users of a computer. In such systems, the necessary control commands are recognized by a recognition device and converted into the respective control commands. There are a number of speech recognition systems available, like the VOICE TYPE DICTATION SYSTEM (VTD) by IBM. This product has been the subject matter of a number of patents, for instance U.S. Pat. No. 4,718,094 entitled "Speech Recognition System" assigned to the present assignee, which can be referred to for more detailed aspects of speech recognition. VTD consists of speaker dependent and speaker independent software modules and particularly provides a macro editor. The main program is a speech recognition engine which can serve only one application program at a given time. The actual active application window is marked by VTD by means of a colored frame. From a window called "speech control" the user can gather all commands which are currently available.

A first particular feature of VTD is an application programming interface (API) which allows pre-developed application programs to interact with the speech recognition engine of VTD and thus enables integration of speech input eliminating the need for development of a new speech-enabled application program. A second feature of VTD is the above mentioned macro editor which enables a user to create their own macros which allow execution of a number of actions (commands) by uttering only one macronym.

By use of VTD, uttered words can be interpreted and executed as commands (so-called "command mode"), or be recognized as words of a text document (so-called "dictation mode"). Dependent on the underlying computer hardware, the dictation system can perform the recognition process nearly in real time, i.e. the recognized words are displayed on the screen with only a short delay.

A typical range of applications for speech recognition systems would include the acoustic input: of text documents on one side, and on another side, the speech-supported control of application programs of a computer system. A particular requirement of speech controlled operation of an application program is the capability of unrestricted positioning of a pointer in its viewport presented on the GUI. In the case of acoustic input of text documents there exist specific dictation applications which either store the input text as a file, or transfer the input data, via a intermediate buffer storage of the graphical user interface, to another application like a word processing system, in order to post-process the respective file.

For speech controlled processing of an application, in general, so-called macro interfaces are provided which enable adaptation of existing application programs to a speech recognition device without requiring amendments of the application programs themselves. By means of the previously mentioned macro interface, for instance, the program commands or the respective program menu items of the application program are associated with word sequences spoken by the user. For operation of a window system of an application program, e.g. for opening a program file or starting a standard editor, macros are generally predefined.

However, for adaptation of existing application programs to speech controlled operation by means of the above cited macro interface, several restrictions are imposed. The best use of such an interface is the operation of program commands and/or program menu items by an association of word sequences. In such a system, the execution of common window commands such as "minimize", "maximize" and "close" is practicable, and is supported by predefined macros in most speech recognition systems.

Substitution of a pointer based program operation by speech input commands still remains a troublesome undertaking. This is particularly valid for positioning a pointer to a certain point of an application window as would be performed by a movement of a mouse pointer. This kind of operation is a necessary requirement for the operation of a number of application programs such as graphical editors, annotation tools, and table calculation programs.

A known solution to the presented problem are application programs which provide positioning of a mouse pointer via arrow keys of a keyboard. By assigning speech commands to those arrow keys, the mouse pointer may be moved. This approach is rather restrictive in that mouse pointer velocity control in this kind of program is difficult to use and further in that it lacks a user-friendly interface.

Another known solution is the combined use of speech input and mouse navigation for operation of an application program. This approach, of course, is useful for users who are not familiar with mouse operations, but it is not applicable for handicapped users for whom speech input is the only available method of information input to a computer system.

Therefore, the underlying problem the present invention addresses is the need for a navigation method and system for a pointer in a graphical user interface which is controlled solely by speech command input.

SUMMARY OF THE INVENTION

The underlying concept of the present invention is to provide a space of discrete position states (quantization) for the pointer device. The pointer device can only be navigated via those discrete positions by means of speech command input. In particular, the navigation of the pointer is independent of the respective application program.

According to a first embodiment of the present invention, the granularity of the discrete position states can be adapted to the respective application window. In a further embodiment, the position states are represented by a system of coordinates where the speech command input is based on absolute or relative coordinates.

In a preferred embodiment of the present invention, a copy image of the operating graphical user interface is provided in front of, or beside, the actual user interface and a proxy pointer device is displayed on the copy image. The copy image comprises the discrete position states, and speech input commands are transferred to the copy image. Navigation of the pointer device within the copy is transferred and converted into respective commands within the actual user interface. By this method, an operation event effected by a manipulation of the proxy pointer effects a respective operation at the actual user interface.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DESCRIPTION OF ILLUSTRATIVE EMBODIMENT

Figure 1:
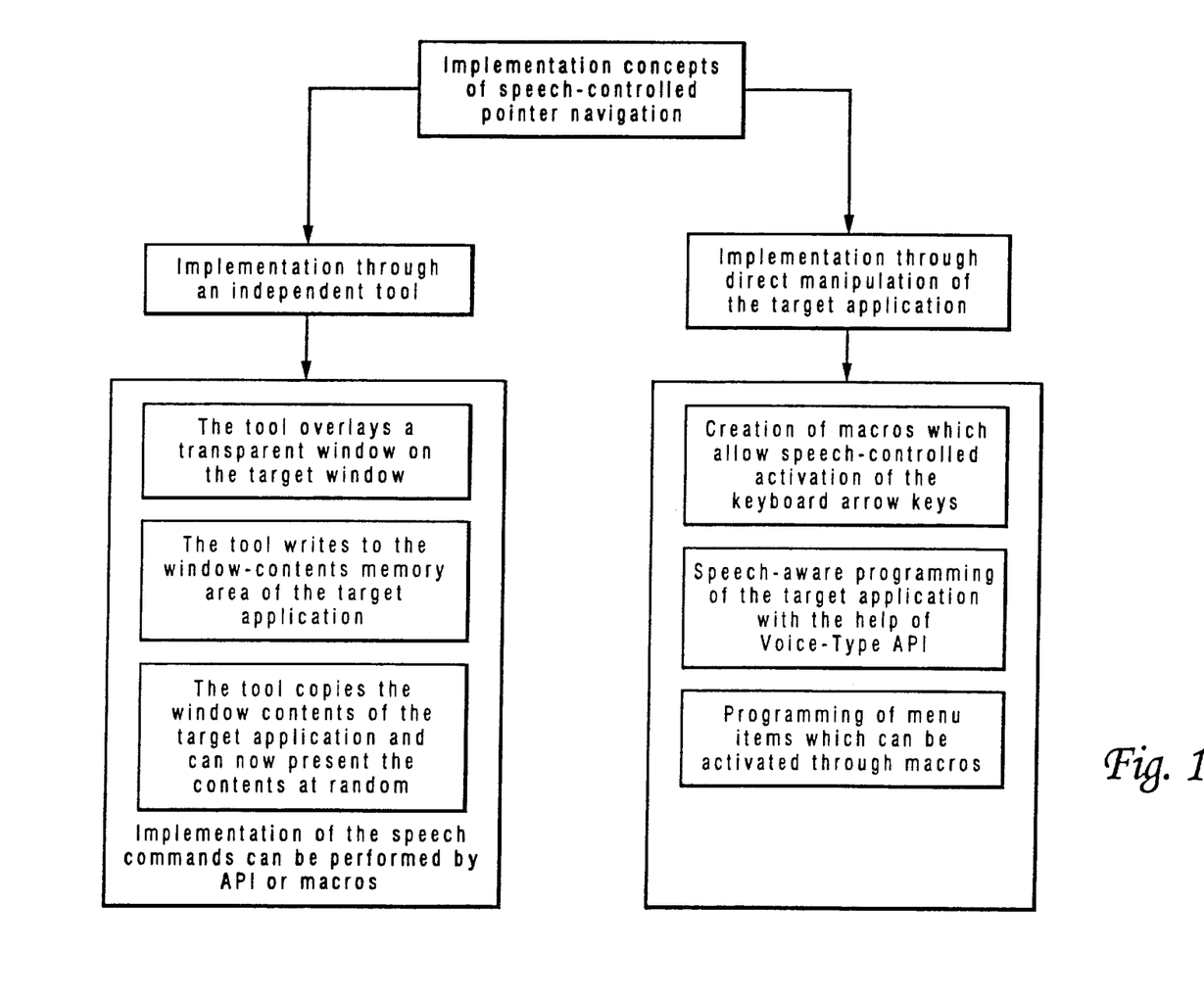
FIG. 1 is an overview diagram illustrating conceptual structures of speech controlled pointer navigation according to the invention.

Two realization concepts of the invention are shown in FIG. 1. Shown at the left is an independent speech navigation tool, and on the right, a way of direct manipulation of the viewport of a selected destination application is presented.

A first method of direct programming of a destination application includes a generation of speech commands via macros which activate the arrow keys on a computer keyboard. For that purpose the only restriction is that the destination application has to support pointer navigation via arrow keys. The advantage of that implementation is that no VTD-API calls are required. The respective macros for operation of the arrow keys have to be created only once and can be applied to other applications which also support arrow key pointer navigation.

A second method involves a implementation of the desired speech functionality at the development stage of an application by help of the VTD-API. By this method, each implementation of the new application requires a new programming effort, and as a consequence, the source code of the application has to be available.

A further method involves a combination of macro programming and adapted programming of the destination application. For all speech commands, menu items or buttons are created.

For the second concept concerning an independent speech controlled navigation tool, the following implementations may be provided.

In a first embodiment of the navigation tool, the navigation tool draws navigation help utilities such as the coordinate grid, directly into the viewport of the destination application. The mouse pointer will be directly controlled or viewed transparently. In a case where the mouse pointer is not otherwise employed, it is suitable to generate a new pointer which is used only during speech navigation.

In a second embodiment, the navigation tool is overlaid onto the destination application as a transparent window which comprises all graphic elements for navigation support. As in the previous embodiment, the mouse pointer or a new pointer specific to the application can be utilized.

In a third embodiment, the navigation tool creates a copy of the window contents of the destination application and is therewith enabled to present the window in arbitrary size at an arbitrary position. Within that window, a new pointer specific to the application can be provided. That pointer can be moved in real time synchronously with navigation commands or it may be viewed at a concluded position after the navigation commands have been fulfilled.

It is noted that the previous embodiments and implementations of the invention are only illustrative in so far as the skilled person can find other embodiments which make use of the above concepts.

The implementation of a independent tool has several advantages over the aforementioned application specific solution. The navigation tool has to be developed only once and can be applied to any application program. Therefore, it can be used as a self-reliant alternative solution to common mouse navigation. However, this solution requires the VTD-API or a similar API to operate.

Figure 2:
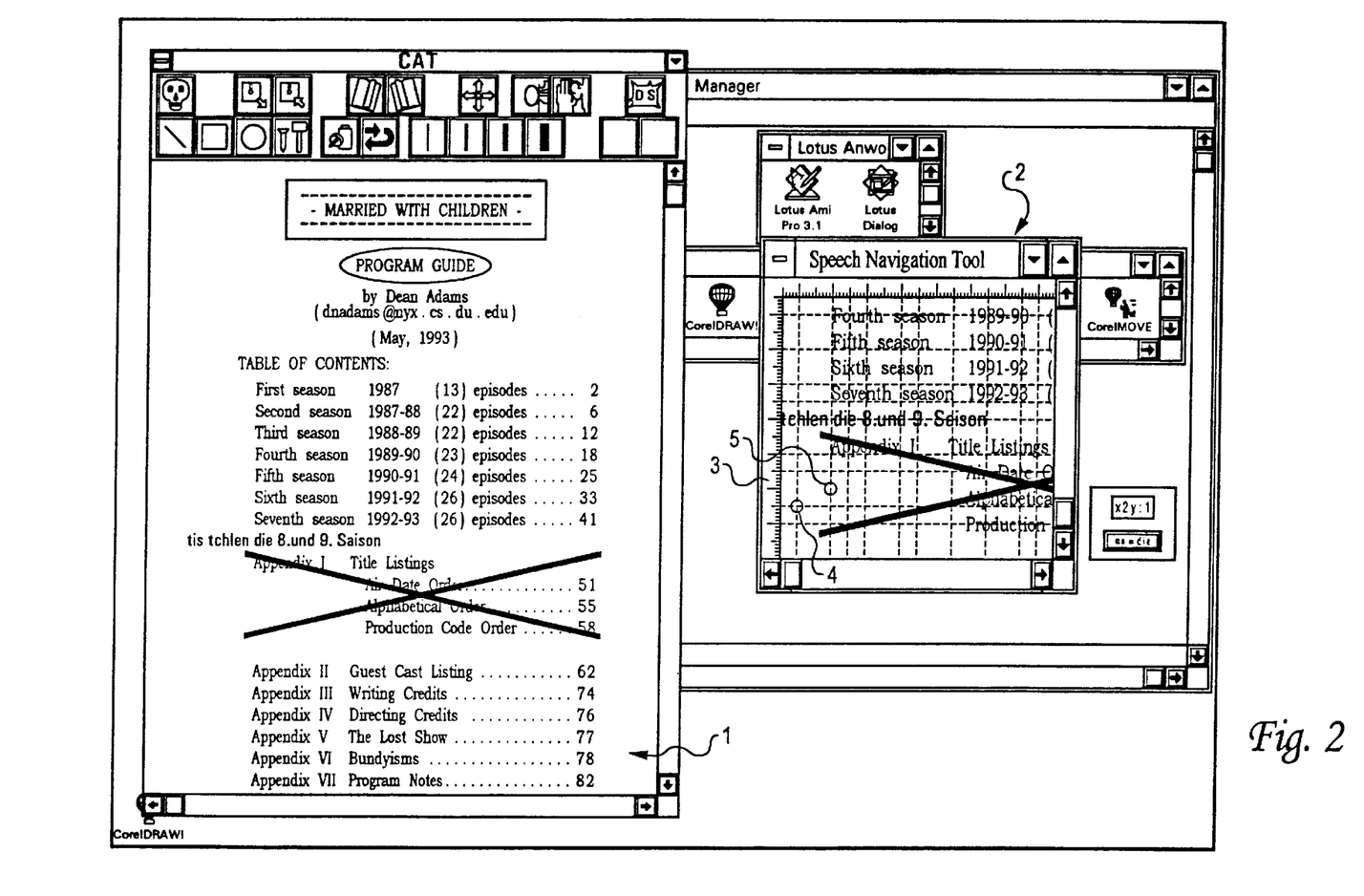
FIG. 2 shows a first embodiment of the present invention where the copy of a respective application window is presented beside the application window.

FIG. 2 shows a typical screen situation for a pointer navigation tool according to the present invention. On the left side of the screen, the current page 1 of an application program is shown, where a mouse operation is envisaged. On the right side of the screen, a smaller window 2 is shown which represents the proposed speech navigating tool. This navigation tool enables the user to navigate the mouse position in the application program on the left side via speech controlled command inputs which can be fulfilled quickly and are user friendly. This navigation tool comprises a coordinate system 3 wherein the mouse pointer can be navigated on intersecting points 4 of that system. The coordinate system is represented by a rectangular coordinate grid. The coordinate grid comprises scales at the x and y axes. Navigation of the mouse pointer 5, shown in the left lower part of the speech navigation tool window, is accomplished by means of navigation commands defining relative or absolute coordinates wherein these navigation commands are input by speech, for instance, by means of a microphone and a speech recognition system executed in the background of the shown application. In this embodiment, the window of the speech navigation tool is presented beside the window of its respective application program. The window of the speech navigation tool selectably shows either a part of the page of the application program or the full page as controlled by common window operations.

Navigation of the pointer device by use of the proposed speech navigation tool is converted into a movement of a pointer device within the application program window. The granularity of the coordinate grid shown within the speech navigation tool can be adapted to the respective and envisaged operations of the mouse pointer. It is also possible to discard the presentation of the coordinate grid. All amendments of the presentation of the speech navigation tool can be accomplished by speech input.

In a conventional scenario of an application without speech input, a user calls up an application program by a double click of the mouse pointer on a respective icon depicted on the screen of the GUI. Having called up the program the user commonly moves the application program window or changes the size of the window. Then he moves the pointer to an item in a menu bar and selects a menu item by a further double click. If the user wants to load a file, he has to select the respective file name within a presented window and confirm the selection by clicking on an "OK" button. After having loaded the file, it is further assumed that the user wants to place a rectangle into the picture of the file. For this he selects the respective icon and places the pointer (cursor) at a desired location within the window. The rectangle can be enlarged while a mouse button is depressed, and when the desired size and position are obtained, the mouse button is released to create the rectangle.

The above procedure includes different kinds of actions. These actions are executed by a user either manipulating a pointer (e.g. computer mouse) or by using a keyboard as an input device and can be divided into the following five classes of action with respect to speech control:

1. Actions with respect to the appearance of an application window;
2. inputs of alphanumeric symbols by a keyboard;
3. calling up an action or application program;
4. reactions to dialog windows; and
5. navigation of a pointer within a viewport of an application.

Although for these actions use of a keyboard or a mouse is very similar, the respective speech commands strongly differ from each other. Actions (commands) concerning manipulation of windows and applications (class 1), e.g. using scroll bars or moving windows, are already supported by the VOICE TYPE SYSTEM (VTD). However, the functionality of VTD in this respect is not user friendly and requires a time consuming training phase to gain performance comparable with mouse control. Thus, this existing functionality is only of interest for users who need alternative solutions such as people with physical disabilities or handicaps.

A so far unsolved problem involves the positioning of a pointer device within a window such as the viewport of an application program or within a GUI of an operating system like the presentation manager of IBM OS/2. In particular a user has an interest in being able to select any point within an application window which may not be defined by the application program or the operating system.

Figure 3A:
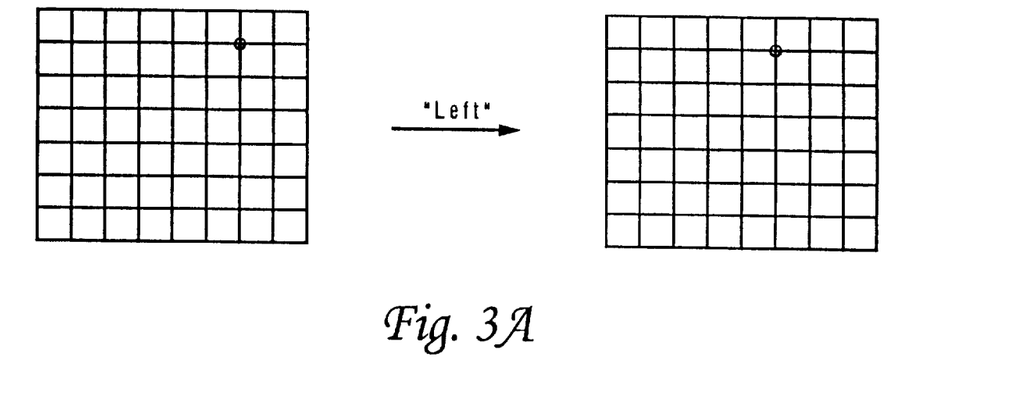
FIGS. 3A–F depict different embodiments of speech controlled navigation of a pointer on a coordinate grid.

Different methods of navigating a pointer in a destination window comprising a grid quantization only by speech commands are depicted in FIGS. 3A–F. A first method of positioning a pointer (cursor) is per directional commands, e.g. a fixed length up, -down, or -left (FIG. 3A). The fixed length has to be fine enough in order to provide a resolution which is required to move the cursor accurately. For example, within an editor window for input of text the minimum length is one cursor position. In contrast to that in a graphics application program the minimum length is about 0.5–2 mm.

If the directional commands are combined with the preposition "towards" then the pointer is positioned at the border of the viewport with respect to the uttered direction. Further commands like "upwards" or "downwards" are provided which let the pointer move continuously. The pointer migrates with constant speed in the desired direction until a command "stop" is spoken.

In graphical application programs, a grid representing a quantization of the permissible space of the pointer is preferred to view the minimum length. Alternatively, word processors like the Editor in VTD the minimum length can be represented by a symbol.

Figure 3B:
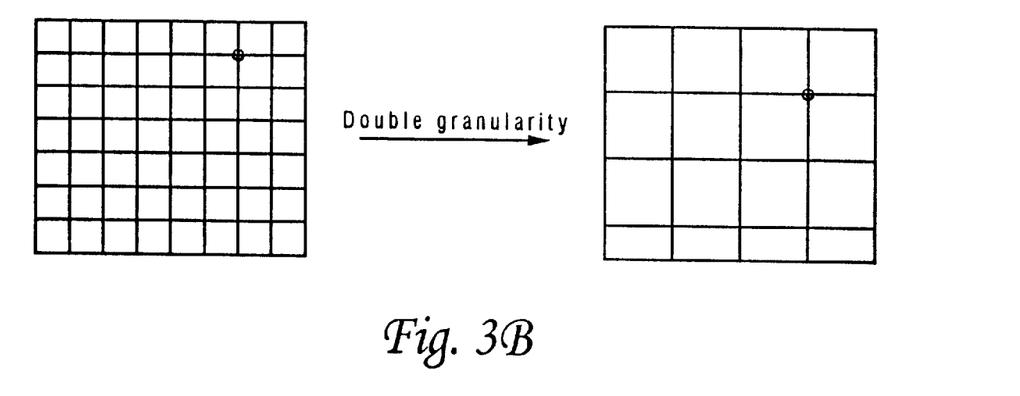

In order to improve the motion speed of the cursor, in an embodiment depicted by FIG. 3B the granularity of the grid can be adapted by the user with respect to the envisaged motion length. The grid distance of the virtual grid is scalable and can be adjusted by speech commands such as "minimum length x" or "doubles granularity". A simple directional command causes migration of the pointer according to the adapted minimum length in the desired direction.

Figure 3C:
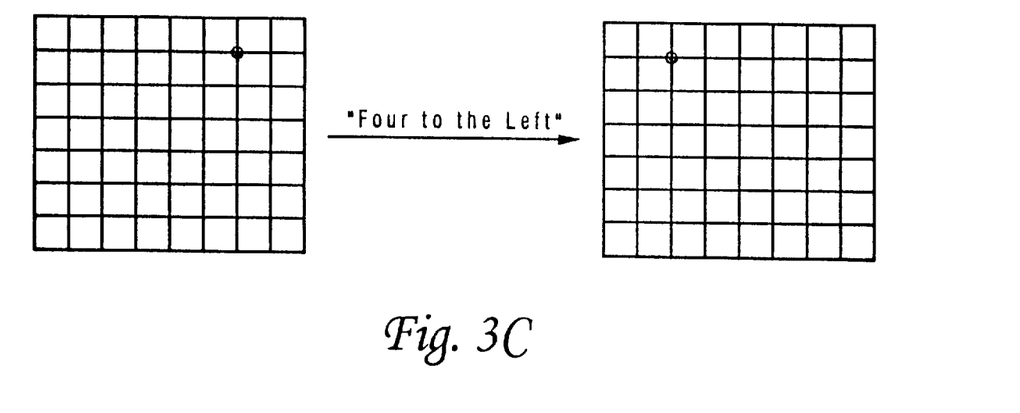

A further embodiment which improves motion speed, but with constant grid granularity, is shown in FIG. 3C where a higher speed is obtained by particular commands like "x steps right", i.e. multiple successive steps are covered by only one command.

Figure 3D:
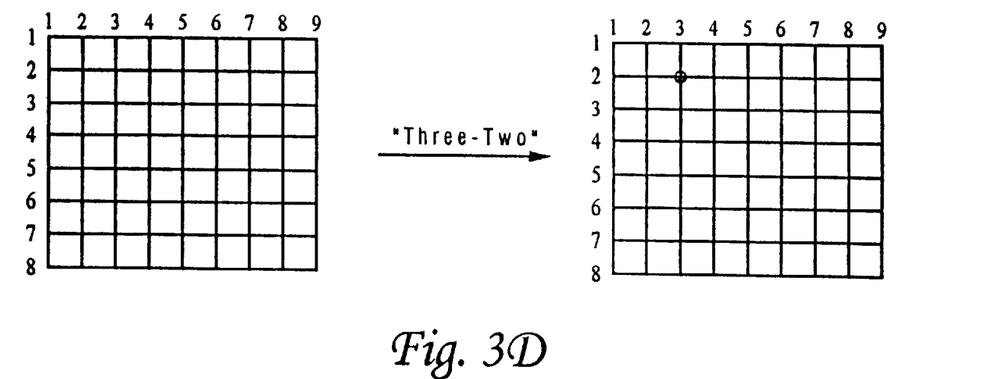

The previously discussed embodiments are related to motion based on relative coordinates, whereas the following embodiment illustrated in FIG. 3D is based on absolute coordinates. By this embodiment, a coordinate system (grid) is overlaid above the viewport of an application and the current position of the pointer is viewed by its respective x,y coordinates. As in the above embodiments, the minimum length of the grid is a sensitive quantity which depends on the respective application. This method allows a constant speed for positioning the pointer which depends on the ability of the user to quickly assign coordinates to the respective grid points. Therefore, it is advantageous to select a minimum length large enough to accomplish this without great effort.

Figure 3E:
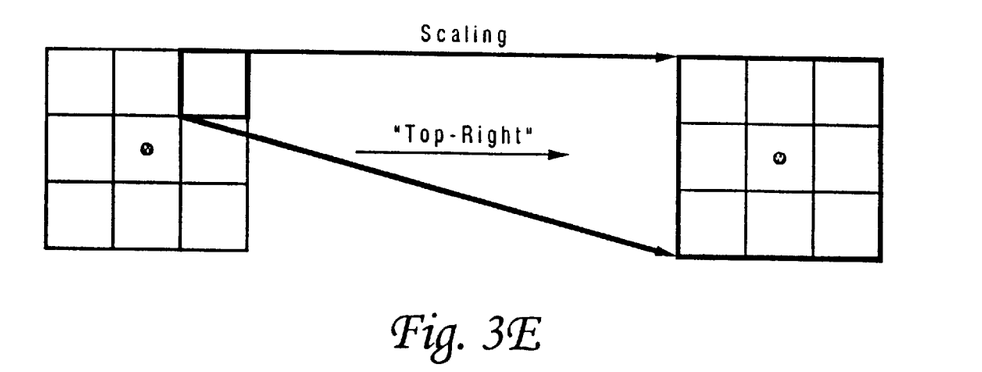

In FIG. 3E a further embodiment is shown where the viewport is subdivided into sections, e.g. quadrants, each of them of identical size. In contrast to the above embodiments, the destination points are not at grid intersection points but at the respective centers of the sections. The desired cursor position is obtained by a number of successive steps wherein a selected sector is presented by the same number of sections, thus enabling motion to the desired position like known "zoom" operations. A particular advantage of this embodiment is that the user can position the pointer with arbitrary precision without adjustments.

Figure 3F:
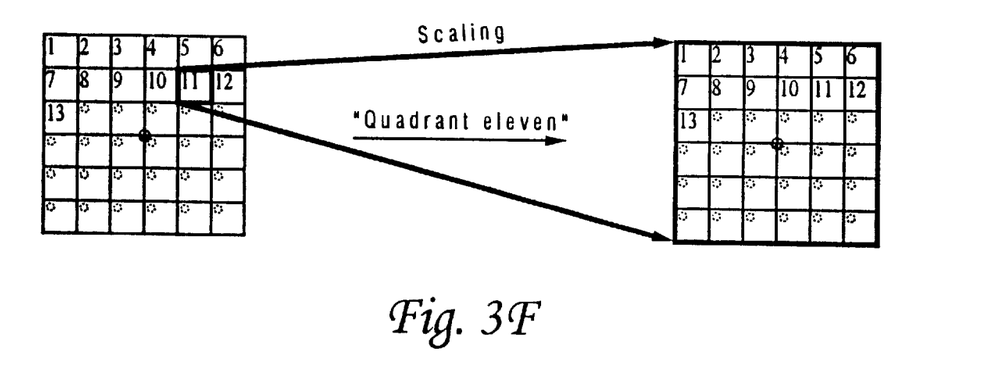

As in FIG. 3D, the foregoing embodiment can be used by means of absolute coordinates. This is shown in FIG. 3F where quadrant "11" is selected for zooming. With absolute coordinates, a position change does not depend on the current position of the pointer. This embodiment is preferred in a case where a large distance exists between the current and the desired position of the pointer since the user is not forced to incrementally cover that distance.

It should be emphasized that the invention may also be performed in combination with other known techniques of pointer navigation, particularly, the use of pen-based computing, touch screen, laser pointer or dataglove. The combination of speech and touch screen is of particular interest in the arena of kiosk information systems.

Figure 4:
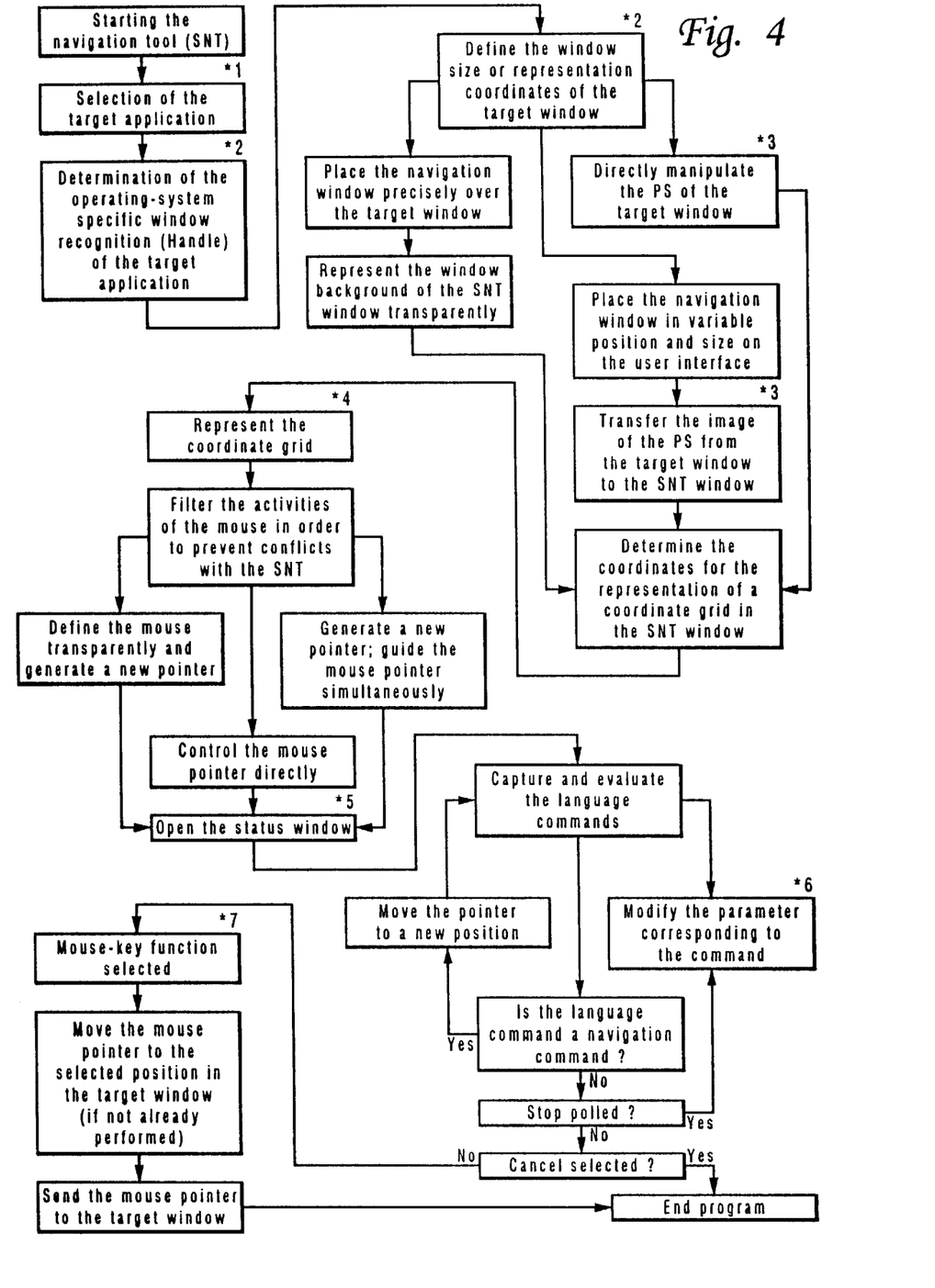
FIG. 4 is a flow chart depicting the functionality of the proposed navigation tool.

The functional features of the proposed speech navigation tool are now discussed in more detail with reference to FIG. 4. Having started the navigation tool, the first necessary step is the selection of a target window in order to identify the respective window. This selection may be accomplished by any of the following three operational steps:

1. selection can be accomplished by a physical input medium like a mouse or a touch screen;
2. the target window can be selected (*1) by help of a speech command where the name of the respective window is entered into the system, assuming that such a name has been previously defined for the window; and
3. selection by help of a recursive calling-up of the speech navigation tool. By this method, the target window is represented by the entire screen. The user has to position, utilizing speech input, a pointer onto the target application and selects that application by a speech activated mouse click. After this, the application program returns back from the recursive loop and works now within the selected target window section.

Determination of the identification of the respective target application, which is specific for the respective operating systems and for determining the dimensions and the presentation coordinates of the target windows, is accomplished by an application program interface call which is specific for the respective operating system. In order to transfer a copy of the presentation space from the target window to the speech navigation tool window, and in order to manipulate the presentation space of the target windows directly, that presentation space under OS/2 is defined by a storage area which contains the window contents of an application which is presented on this screen service.

With regard to the presented coordinate grid, its presentation can be modified by altering pre-adjusted values of color, and/or line widths for graduation of the coordinate grid.

The speech navigation tool provides a status window, which for instance may depict the actual position of the pointer as X, Y-coordinate values, and additionally the pre-adjusted parameters of the navigation tool. If those parameters are not shown in the status window, a new window has to be opened at this position where the possible modification is presented. Conceivable parameters (*6) (with exception of the parameters cited above) are:

- a magnification factor for the target window contents;
- positioning of the window of the navigation tool automatically, for instance, as a full screen presentation, a presentation in front of the target window or a presentation beside the target window;
- recursive call up of the speech navigation tool in order to place the speech navigation tool window at a new position on the service of the user interface;
- switching on/off a coordinate system;
- switching on/off a coordinate grid;
- election of a respective navigation method.

An exemplary implementation of the invention as a software program is described with regard to the following program scheme which is presented as pseudo code.

```
snt(window_handle, representation_mode)
    /* window_handle of application in which navigation
takes place
*/
    /* representation mode: OVERLAY | EXTRA_WINDOW*/
{
    snt_window_displayed = FALSE;
    repeat {
        get_speech_command(&speech_command) /* blocking */
        if ( snt_window_displayed == FALSE ) {
            /* grab and display new application window */
            get_window_size(&x_size, &y_size);
            get_window_bitmap(&window_bitmap);
            add_grid(&window_bitmap, grid_parameter, x_size,
y_size)
            if ( representation_mode == OVERLAY ) {
                display_snt_overlay_window(window_handle,
window_bitmap);
            } else {
                display_snt_seperate_window(window_bitmap);
            }
            snt_window_displayed = TRUE;
            snt_mouse_x = 0; snt_mouse_y = 0;
            display_snt_mouse() ; /* indicates mouse position to
```

```
the user */
        } /* endif */
        if ( speech_command ==
MOUSE_POSITIONING_COMMAND ) {
            switch speech_command {
                case RIGHT(x):
                    snt_mouse_x += x;
                    break;
                case UP(y)
                    snt_mouse_y += y;
                    break;
                case POS(x, y):
                    snt_mouse x = x; snt_mouse_y = y;
                    break;
                ...
                case BOTTOM_LEFT:
                    snt_mouse_x = 0; snt_mouse_y = 0;
            } /* end switch */
            display_snt_mouse();
        } /* endif */
        if ( speech_command == GRID_COMMAND ) {
            add_grid(window_bitmap, new_grid_parameter, x_size,
y_size);
        } /* endif */
        if ( speech_command == MOUSE_CLICK_COMMAND ) {
            switch speech_command {
                case LEFT_MOUSE_CLICK:
                    send_mouse event(window_handle,
                                snt_mouse_x, snt_mouse_y,
                                event) } /* end switch */
                    break;
                ...
            } /* end switch */
            /* mouse click leads to program execution    */
            /* remove snt-window to allow refreshing of */
            /* application window                        */
            remove_snt_window();
            snt_window displayed = FALSE;
        } /* endif */
    } until ( speech_command == STOP_SNT )
} /* end snt program */
```

Through the execution of the routine above, a coordinate grid is overlaid on an application window and a respective quantization of the permissible area for the pointer provided. The pointer can be moved according to the previously described commands illustrated in FIGS. 3A–F.

Figure 5:
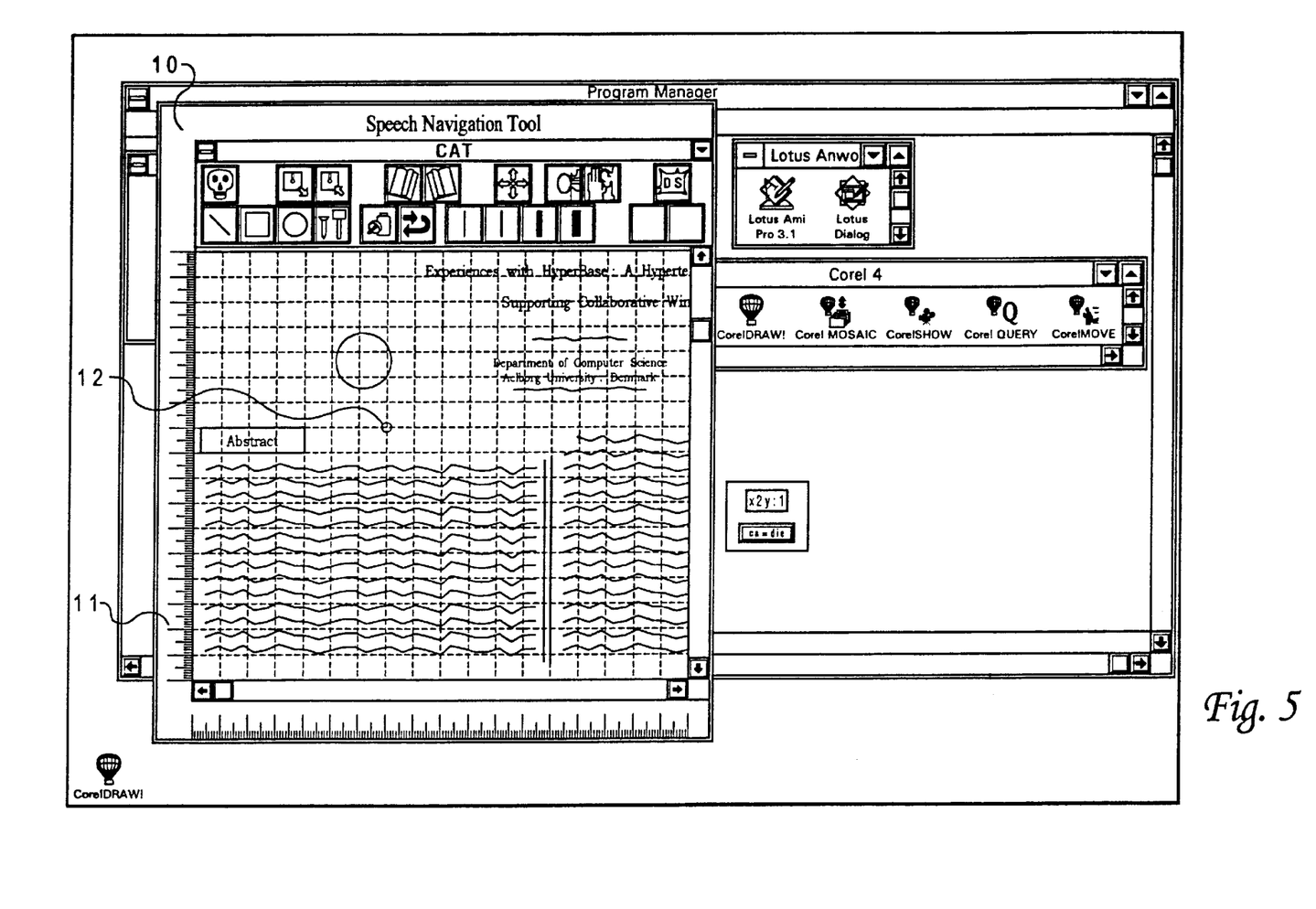
FIG. 5 shows a second embodiment of the invention according to FIG. 1 where the copy of an application window is presented in front of the application window.

A preferred embodiment of the invention is shown in FIG. 5. In this embodiment, the speech navigation tool window 10 covers the application window (not seen) completely. Therefore this second approach suggests the complete integration of the speech navigation tool into the application program. The user navigates the mouse pointer by speech commands, based on the presented coordinate grid 11. The resulting navigation of the pointer is continuously indicated by a movement of the pointer symbol 12 on the coordinate grid of the navigation tool. In the case presenting the output window of the speech navigation tool beside the output window of the application program, navigation of the mouse pointer within the navigation tool effects the same movement of the mouse pointer in the application program window.

The speech navigation tool supports the following navigation methods:

- entering in absolute coordinates, e.g. '15,7' where the first number designates an X-coordinate and the second number a Y-coordinate;
- entering coordinate values which are relative to the actual input position of the mouse pointer, e.g. '3 up, 7 down';
- entering specific points of the grid such as 'center', 'right edge', or 'left below'.

After positioning the mouse pointer, operation of the mouse keys is accomplished by speech input where the following operation steps are supported:

single or double click by reference of the respective mouse key, e.g. 'left click, right click';

a key stroke of the mouse key, e.g. 'left pressed, right release';

simultaneously striking the left and the right mouse key, e.g. 'left-right click'.

Mouse operations which are controlled by speech input via the speech navigation tool cause respective mouse operation events at the underlying application program and have the same effect as the physical operation of a mouse at the actual input position of the mouse pointer on the application window. The result of the execution of the application program may be made visible as a new copy of the application window within the speech navigation tool window. When the functionality of the navigation tool is no longer needed, the speech navigation tool is exited by means of respective speech input commands.

With respect to the specific requirements of the application program which is to be operated, a number of parameters of the speech navigation tool can be specified by means of speech input. For instance, the granularity of the coordinate grid can be adjusted in order to optimize the accuracy of aim for positioning the mouse pointer within the application program window. The following additional parameters can also be modified during runtime of the speech navigation tool:

labels of the coordinate scales;

granularity of the coordinate grid;

presentation or non-presentation of the coordinate grid;

the color or the gray scale of the coordinate grid;

the respective piece cut out of the application program window;

the magnification factor of the presented piece cut out of the application program window.

As known from the art of speech recognition, it is generally possible for the speech navigation tool to adjust the assignment of the controlled commands to the spoken word sequences of a specific user.

While the invention has been particularly shown and described with reference to a preferred embodiment, it will be understood by those skilled in the art that various changes in form and detail may be made therein without departing from the spirit and scope of the invention.

What is claimed is:

1. A method for speech-supported navigation of a cursor within a graphical user interface, said method comprising the steps of:

defining a coordinate system including a plurality of discrete position states within said graphical user interface;

scaling a granularity of said coordinate system in response to a first speech command; and navigating said cursor among said plurality of discrete position states in response to a second speech command.

2. A method for speech-supported navigation of a cursor within a graphical user interface as set forth in claim 1, further comprising the step of manipulating said graphical user interface in response to said navigating step.

3. A method for speech-supported navigation of a cursor within a graphical user interface as set forth in claim 1, said scaling step comprising the step of modifying a minimum length of said coordinate system.

4. A method for speech-supported navigation of a cursor within a graphical user interface as set forth in claim 1, said method further comprising the step of displaying a coordinate grid including a plurality of intersection points corresponding to said plurality of discrete position states.

5. A method for speech-supported navigation of a cursor within a graphical user interface as set forth in claim 4, said navigating step comprising the step of navigating said cursor among said plurality of discrete position states in response to a second speech command including one of said plurality of intersection points.

6. A method for speech-supported navigation of a cursor within a graphical user interface as set forth in claim 1, said establishing step comprising the step of establishing an absolute coordinate for each of said plurality of discrete position states;

said navigating step comprising the step of navigating said cursor among said plurality of discrete position states in response to a second speech command including one of said plurality of absolute coordinates.

7. A method for speech-supported navigation of a cursor within a graphical user interface as set forth in claim 1, said method further comprising the steps of:

displaying a copy of said graphical user interface;

displaying a proxy cursor within said copy of said graphical user interface;

indicating a current position state of said cursor from among said plurality of discrete position states utilizing said proxy cursor;

said navigating step comprising the steps of:

navigating said proxy cursor in response to said second speech command; and navigating said cursor among said plurality of discrete position states in response to said step of navigating said proxy cursor.

8. A data processing system for speech-supported navigation of a cursor within a graphical user interface comprising:

means for generating a copy of said graphical user interface;

means for generating a proxy cursor within said copy of said graphical user interface;

means for simultaneously displaying said copy of said graphical user interface and said proxy cursor;

means for navigating said proxy cursor within said copy of said graphical user interface in response to a speech command; and means for navigating said cursor in response to a navigation of said proxy cursor.

9. A data processing system for speech-supported navigation of a cursor within a graphical user interface as set forth in claim 8, said means for navigating said proxy cursor within said copy of said graphical user interface in response to a speech command comprising:

means for defining a coordinate system including a plurality of discrete position states within said copy of said graphical user interface;

means for scaling a granularity of said coordinate system in response to a first speech command; and means for navigating said proxy cursor among said plurality of discrete position states in response to a second speech command.

10. A data processing system for speech-supported navigation of a cursor within a graphical user interface as set forth in claim 9, said means for scaling comprising means for modifying a minimum length of said coordinate system.

11. A data processing system for speech-supported navigation of a cursor within a graphical user interface as set forth in claim 9, further comprising:

means for displaying a coordinate grid within said copy of said graphical user interface including a plurality of intersection points corresponding to said plurality of discrete position states;

said means for navigating said proxy cursor among said plurality of discrete position states in response to a second speech command comprising means for navigating said proxy cursor among said plurality of discrete position states in response to a second speech command including one of said plurality of intersection points.

12. A data processing system for speech-supported navigation of a cursor within a graphical user interface as set forth in claim 9, further comprising means for indicating a current position state of said cursor from among said plurality of discrete position states utilizing said proxy cursor.

13. A data processing system for speech-supported navigation of a cursor within a graphical user interface as set forth in claim 8, further comprising:

means for generating an operation event within said graphical user interface in response to a navigation of said proxy cursor; and means for displaying an operation event within said copy of said graphical user interface in response to a generation of an operation event within said graphical user interface.

14. A computer program product to be utilized within a data processing system for speech-supported navigation of a cursor within a graphical user interface comprising:

media usable by said data processing system for storing and executing instruction means;

instruction means, embodied within said media, for generating a copy of said graphical user interface;

instruction means, embodied within said media, for generating a proxy cursor within said copy of said graphical user interface;

instruction means, embodied within said media, for simultaneously displaying said copy of said graphical user interface and said proxy cursor;

instruction means, embodied within said media, for navigating said proxy cursor within said copy of said graphical user interface in response to a speech command; and instruction means, embodied within said media, for navigating said cursor in response to a navigation of said proxy cursor.

15. A computer program product for speech-supported navigation of a cursor within a graphical user interface as set forth in claim 14, said instruction means for navigating said proxy cursor within said copy of said graphical user interface in response to a speech command comprising:

instruction means, embodied within said media, for defining a coordinate system including a plurality of discrete position states within said copy of said graphical user interface;

instruction means, embodied within said media, for scaling a granularity of said coordinate system in response to a first speech command; and instruction means, embodied within said media, for navigating said proxy cursor among said plurality of discrete position states in response to a second speech command.

16. A computer program product for speech-supported navigation of a cursor within a graphical user interface as set forth in claim 15, said instruction means for scaling comprising instruction means, embodied within said media, for modifying a minimum length of said coordinate system.

17. A computer program product for speech-supported navigation of a cursor within a graphical user interface as set forth in claim 15, further comprising:

instruction means, embodied within said media, for displaying a coordinate grid within said copy of said graphical user interface including a plurality of intersection points corresponding to said plurality of discrete position states;

said instruction means for navigating said proxy cursor among said plurality of discrete position states in response to a second speech command comprising instruction means, embodied within said media, for navigating said proxy cursor among said plurality of discrete position states in response to a second speech command including one of said plurality of intersection points.

18. A computer program product for speech-supported navigation of a cursor within a graphical user interface as set forth in claim 15, further comprising instruction means, embodied within said media, for indicating a current position state of said cursor from among said plurality of discrete position states utilizing said proxy cursor.

19. A computer program product for speech-supported navigation of a cursor within a graphical user interface as set forth in claim 14, further comprising:

instruction means, embodied within said media, for generating an operation event within said graphical user interface in response to a navigation of said proxy cursor; and instruction means, embodied within said media, for displaying an operation event within said copy of said graphical user interface in response to a generation of an operation event within said graphical user interface.

* * * * *